(12) United States Patent
Atkinson

(10) Patent No.: US 6,348,092 B1
(45) Date of Patent: Feb. 19, 2002

(54) SURFACE TREATMENTS FOR PIGMENTS PROVIDING IMPROVED DISPERSIBILITY AND EXHIBITING BIOCIDAL ACTIVITY

(76) Inventor: George K. Atkinson, P.O. Box 1684, Laurel, MS (US) 39441

( * ) Notice: Subject to any disclaimer, the term of this patent is extended or adjusted under 35 U.S.C. 154(b) by 0 days.

(21) Appl. No.: 09/426,709

(22) Filed: Oct. 25, 1999

(51) Int. Cl.[7] .............................................. C07C 229/00
(52) U.S. Cl. ........................ 106/505; 106/448; 106/449; 106/18.32; 106/18.35; 516/DIG. 5; 514/561; 562/553; 562/574
(58) Field of Search ............................ 106/18.32, 18.35, 106/436, 437, 448, 477, 493, 499, 504, 505; 554/103, 107; 562/574, 553; 514/561; 516/DIG. 5

(56) References Cited

U.S. PATENT DOCUMENTS

| | | | | |
|---|---|---|---|---|
| 4,165,239 A | * | 8/1979 | Linden et al. | 106/300 |
| 4,599,114 A | * | 7/1986 | Atkinson | 106/448 |
| 4,632,704 A | * | 12/1986 | Babler | 106/288 |
| 4,741,780 A | * | 5/1988 | Atkinson | 106/300 |
| 4,909,852 A | * | 3/1990 | Atkinson | 106/448 |
| 5,700,395 A | * | 12/1997 | Thetford et al. | 252/309 |
| 5,808,118 A | * | 9/1998 | Atkinson | 554/46 |
| 6,126,734 A | * | 10/2000 | Beall et al. | 106/487 |

* cited by examiner

*Primary Examiner*—Anthony Green
(74) *Attorney, Agent, or Firm*—Herbert M. Hanegan, Esq

(57) ABSTRACT

A composition consisting of the reaction product of a halogenated carboxylic acid, an amine, and optionally a fatty acid. The composition has biocidal properties and enhances pigment dispersibility.

9 Claims, No Drawings

SURFACE TREATMENTS FOR PIGMENTS PROVIDING IMPROVED DISPERSIBILITY AND EXHIBITING BIOCIDAL ACTIVITY

This invention relates to surfactant treated particulate titanium dioxide and other pigments. More particularly, this invention is concerned with surfactant treated titanium dioxide and other particulate materials readily employable in coating compositions, plastic molding compositions, reinforced plastic composite compositions, and paper making compositions.

Industrial pigment particles agglomerate or cake together into hard packed clusters during the drying operation near the end of the manufacturing process. Forces holding pigment clusters together are not large in many cases but are yet large enough that the pigment user, those who incorporate industrial pigments into their products such as paints and plastics and the like, are required to subject industrial pigments to a milling operation in which the agglomerates are sheared under stress into particles of suitable smallness and homogenized into the matrix or product which incorporates them. The process is dispersion.

Pigment dispersion is a bottleneck, a limiting requirement, and the most expensive operation in terms of energy and time in manufacturing processes which employ pigments. This present invention is concerned with the employment of surfactants for the surface treatment of pigments during the pigment manufacturing process in order to provide pigments of improved dispersibility in subsequent manufacturing processes and in some cases, to provide improvements in certain important aspects of products incorporating these surface treated pigments.

Titanium dioxide pigments present a special case. Uncoated titania pigments are extremely difficult to disperse. In addition, their employment in pigmented plastics, coatings, papers, and fiber compositions induces a photoactivity which results in oxidative degradation which is destructive of the materials of which they are a part. As a consequence, most titanium dioxide pigments are provided with some form of surface coating during manufacture to promote dispersibility and to reduce photoactivity. Two materials in widespread use at present are silica and alumina. These materials are coated onto the surfaces of pigment particles in the range of three to ten percent by weight of $TiO_2$.

The surface treatment of pigments can provide the following beneficial primary effects:

1. The total number of agglomerates is reduced.
2. Any agglomerates that are present are more easily broken up since their mechanical strength is reduced.
3. Pigment particle wettability is improved due to a lowering of the interfacial tension between the pigment surface and the application medium
4. Wettability of the pigment particles is also improved due to the liberation of the free energy of solution of the coating agent on the pigment surface. (Surface Treatment of Organic Pigments; K. Merkle and H. Schafer, Pigment Handbook, page 158, Vol. III; John Wiley and Sons, Inc., 1973.)

Pigments, their preparation and properties are described in volumes I, II and III of the book "Pigment Handbook" published by John Wiley & Sons, Inc. The uses, preparation and characterization of pigments is further described in the various units of "The Federation Series on Coating Technology" published by the Federation of Societies for Coating Technology.

German Pat. Nos. 889,042 and 930,998 teach the use of surface-active substances as emulsifiers together with oils in the manufacture of water-insoluble azo-dyestuffs having a soft grain.

U.S. Pat. No. 3,120,508 discloses that water-insoluble azo-dyestuffs having a particularly high tinctorial strength can be prepared by adding during the coupling cationic surface-active compounds without simultaneously using oils.

U.S. Pat. No. 3,437,502 teaches improvement of opacity and dispersibility of titanium dioxide through surface treatment with silica and alumina. U.S. Pat. No. 3,658,566 teaches the production of titanium dioxide of improved properties by treatment with oxides of silicon and aluminum U.S. Pat. No. 4,599,114 discloses improvement of pigmentary properties for a variety of pigments through surface treatment of pigment filter cakes.

Cationic surface-active compounds are described in the book "Surface-Active Agents and Detergents" by A. M. Schwartz, J. W. Perry and J. Berch, vol. II (1958), pages 103 to 119.

U.S. Pat. Nos. 4,599,114, 4,741,780 and 4,909,852 disclose compositions having surfactants consisting of the reaction product of a diamine, a carboxylic acid and a fatty acid. U.S. Pat. No. 5,808,118 discloses a composition which is the reaction product of a diamine, a sulfonic acid and a fatty acid.

British Patent No. 1,080,115 discloses the use of primary long chain alkyl amines for treating pigments improving their dispersibility.

Suitable cationic surface-active substances are, for example, long-chained aliphatic amino compounds that contain about 10 to 18 carbon atoms, or the salts of such nitrogen compounds with carboxylic acids, such as for example, formic acid, acetic acid, oleic acid, tallow fatty acid, lactic acid or mineral acids, for example, hydrochloric acid. Fatty amines are for example, coconut oil amine, oleyl amine, stearyl amine, and tallow fat amine, as well as the secondary and tertiary amines or quaternary ammonium compounds derived therefrom that may carry as substituents aliphatic, aromatic or oxethylated radicals, for example, alkyldimethyloxyethyl ammonium chloride. Oxethylated fatty amines in their secondary, tertiary or quaternary form are also suitable. Also useful are the condensation products of long-chained, in some cases also unsaturated, carboxylic acids with amines, in particular alkylenediamines, alkylenetriamines, or alkylenepolyamines containing alkylene radicals of low molecular weight, for example, ethylene diamine, diethylene triamine, etc., as well as the secondary, tertiary or quaternary amines formed by alkylation of the condensation products, especially in the form of their water-soluble salts with the above-mentioned acids. Further, there may be used fatty acid amides and esters of long-chained carboxylic acids with alkylol amines, for example, triethanolaminoleate, stearate, and the like, further also cyclical, nitrogen-containing compounds, for example, long-chained derivatives of morpholine, imidazoline, piperidine, piperazine or pyridine. The above-mentioned amino compounds are used preferably in the form of their carboxylic or hydrochloric salts.

There is described herein the use of surfactants which have the capability of increasing the dispersibility of titanium dioxide and other pigments to which they are applied.

Titanium dioxide is an established pigmentary material which can also be employed as a reinforcing filler, albeit an expensive one. It is commonly made by two processes, the chloride process and the sulfate process. The chloride process is dry process wherein $TiCl_4$ is oxidized to $TiO_2$ particles. In the sulfate process titanium sulfate, in solution, is converted by a metathesis reaction to insoluble and particulate titanium dioxide. In both processes, particle formation can be seeded by aluminum compounds. Thereafter, the processes are essentially the same. The TiO$_2$ particles in a water slurry are put through multiple hydroseparations to separate out the large particles and the further refined pigment in slurry form is passed to a treating tank where the particles may be treated with an aluminum compound and/or silicon compound, such as aluminum triethoxide, sodium aluminate, aluminum trichloride, aluminum sulfate, ethyl silicate, sodium silicate, silicon tetrachloride, trichlorosilane, and the like. By pH adjustment, the pigment is flocculated and precipitated with its coating of alumina and/or silica, or without any coating. It is then made into a filter cake by a vacuum drying and further dried in an oven, generally of a vibrating type. The optimum average particle size can range from about 0.05 to about 0.35 microns with a range of about 0.1 to about 0.25 more preferable.

One feature of the dispersion promoters of this invention is that they alter the surface characteristics of the titanium dioxide or other pigments so that it is more readily and more thoroughly dispersed within the resin or plastic in which it is incorporated, and this serves to enhance the appearance of the resulting composite and increase the overall strength of the composite when the particulate material employed is one which serves to reinforce the plastic or resin.

The amount of dispersion promoter provided upon the titanium dioxide particles, as characterized herein, is that amount which alters the surface characteristics of the particles so that they are more readily dispersed within the resin, plastic, paper making composition or other medium in which they are incorporated. Typically, the amount of the dispersion promoter which is supplied to the titanium dioxide may be from as little as about 0.25 weight percent to about 5 weight percent, based upon the weight of the titanium dioxide particles. As a rule, about 0.5 to about 3 weight percent of the dispersion promoter and/or its derivatives is adequate for the purposes of appropriately altering the surface characteristic of the particles. Preferred is 2%. Most preferred is 2 or less weight percent for titanium dioxide and inorganic color pigments, 1 or less weight percent for inert pigments, and much higher amounts for the organic and carbon black pigments which have very high surface areas. For some pigment and mediums the amount of dispersion promoter may be from about 1.00 to about 15.0 percent or higher.

The amount of dispersion promoter provided when used with carbon black particles, as characterized herein, is that amount which alters the surface characteristics of the particles so that they are more readily dispersed within the resin, plastic, paper making composition or other medium in which they are incorporated. Typically, the amount of the dispersion promoter which is supplied to the carbon black may be from as little as about 1.00 weight percent to about 15.0 weight percent, based upon the weight of the carbon black particles. As a rule, about 4.0 to about 10.0 weight percent of the dispersion promoter and/or its derivatives is adequate for the purposes of appropriately altering the surface characteristic of the particles. Most preferred is about 8.0 percent.

The amount of dispersion promoter provided when an organic pigment is used, as characterized herein, is that amount which alters the surface characteristics of the pigment so that it is more readily dispersed within the resin, plastic, paper making composition or other medium in which it is incorporate. Typically, the amount of the dispersion promoter which is supplied to the organic pigment may be from as little as about 1.00 weight percent to about 15.0 weight percent, based upon the weight of the organic pigment. As a rule, about 4.0 to about 10.0 weight percent of the dispersion promoter and/or its derivatives is adequate for the purposes of appropriately altering the surface characteristic of the pigment. Most preferred is about 4.0 percent.

The amount of dispersion promoter provided when inert pigments are used, as characterized herein, is that amount which alters the surface characteristics of the pigment so that it is more readily dispersed within the resin, plastic, paper making composition or other medium in which it is incorporated. Typically, the amount of the dispersion promoter which is supplied to the inert pigment may be from as little as about 0.25 weight percent to about 3 weight percent of the dispersion promoter and/or its derivatives which is adequate for the purposes of appropriately altering the surface characteristic of the pigment. Most preferred is 1%.

The amount of dispersion promoter provided when inorganic color pigments are used, as characterized herein, is that amount which alters the surface characteristics of the pigment so that it is more readily dispersed within the resin, plastic, paper making composition or other medium in which it is incorporated. Typically, the amount of the dispersion promoter which is supplied to the inorganic color pigments may be from as little as about 0.25 weight percent to about 5 weight percent of the dispersion promoter and/or its derivatives which is adequate for the purposes of appropriately altering the surface characteristic of the pigment. Most preferred is 2%.

The surfactants of this invention perform the role of dispersants when added directly to conventional paint formulations.

The dispersion promoter and/or its derivatives may be provided on the titanium dioxide particles by any of the known methods by which dispersion promoters are similarly supplied to particulate surfaces. Thus adding the dispersion promoter to the particles while tumbling, mixing the particles in a dilute liquid composition containing the dispersion promoter, or forming a slurry of the particles and dispersion promoter and drying, spray drying or the like represent adequate treating procedures.

The plastics and/or resin in which the titanium dioxide particles treated with the dispersion promoter and/or its derivatives include essentially any plastic and/or resin. Included in the definition of plastic are rubber compounds. The treated titanium dioxide particles may be supplied to the plastic and/or resin while the same is in any liquid or compoundable form such as a solution, suspension, latex, dispersion, and the like. It makes no difference from the standpoint of this invention whether the plastic contains solvent or nonsolvent, or the solvent is organic or inorganic except, of course, it would not be desirable for any plastic or resin or any of the treated titanium dioxide to employ a solvent or dispersing medium which deleteriously affects the components being blended.

Suitable plastics and resins include, by way of example, thermoplastic and thermosetting resins and rubber compounds (including thermoplastic elastomers). The plastics and resins containing the treated particles of this invention may be employed, for example, for molding (including extrusion, injection, calendaring, casting, compression, lamination, and/or transfer molding), coating (including lacquers, film bonding coatings, powder coatings, coatings containing only pigment and resin, and painting,) inks, dyes, tints, impregnations, adhesives, caulks, sealants, rubber goods, and cellular products. Thus the choice and use of the plastics and resins with the treated particles of this invention is essentially limitless. For simple illustration purposes, the plastics and resins may be alkyd resins, oil modified alkyd resins, unsaturated polyesters employed in GRP applications, natural oils, (e.g., linseed, tung, soybean), epoxides, nylons, thermoplastic polyester (e.g., polyethyleneterephthalate, polybutyleneterephthalate), polycarbonates, polyethylenes, polybutylenes, polystyrenes, styrene butadiene copolymers, polypropylenes, ethylene propylene co- and terpolymers, silicone resins and rubbers, EPDM rubbers, SBR rubbers, nitrile rubbers, natural rubbers, acrylics (homopolymer and copolymers of acrylic acid, acrylates, methacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers) ethyl cellulose, the cellulose acetates and ethylene-vinyl acetate copolymers, ethylene-acrylic acid copolymers, ethylene-acrylate copolymers), and the like.

Most pigments go through an aqueous phase in manufacture in which the pigment particles are present at maximum fineness. This phase offers an ideal opportunity to contact the individual particles with a surface treating agent or surfactant with resulting important benefits to pigment dispersibility.

The agents of the present invention also exhibit biocidal activity when employed solely as a composition, when used as an additive, or when combined with a pigment to be applied to a surface.

The present invention is directed to an agent having the general formulas:

a halogenated carboxylic acid and an amine, or a halogenated carboxylic acid and a fatty acid, combined with a polyamine.

The reaction may be carried out in the presence of a medium such as propylene glycol or isopropyl alcohol.

Advantageous halogenated carboxylic acids include chloroacetic acid, chloropropionic acid, trichloroacetic acid, chlorofluoroacetic acid, trifluoroacetic acid, bromopropionic acid, and iodobenzoic acid.

Advantageous fatty acids include, oleic acid, stearic acid, coconut fatty acid, soya fatty acid, ether acids or 3-(alkoxy-) propionic acids where the alkyl group is eight or more, and polymerized $C_{18}$ acids.

Advantageous polyamines include coco, tallow, and oleyl diamines, 3-diethylaminepropylamine, and ether amines having the formula $ROCH_2CH_2CH_2NHCH_2CH_2CH_2NH_2$ where R is six or more.

Many combinations of these components have been found to be useful. Advantageous compositions include one equivalent of 2-chloropropionic acid and one equivalent of stearic acid combined with two equivalents of tallow diamine (Formula A, Example I). One equivalent of 2-chloropropionic acid and three equivalents of coconut fatty acid combined with four equivalents of tallow diamine (Formula B, Example II).

Some of the compositions of this invention may be used as direct-add dispersants in conventional paint dispersion. An example is one equivalent of 2-bromopropionic acid and one equivalent Of $C_{18}$ polymerized fatty acid combined with two equivalents of tallow diamine. The reaction was carried out in propylene glycol equal to 25% by weight of the composition. (Formula C, Example III). An effective direct-add dispersant can be produced by combining a halogenated carboxylic acid with an appropriate amine. An example is one equivalent of 2-chloropropionic acid combined with one equivalent of tallow diamine, the reaction carried out in propylene glycol equal to 25% of the weight of the composition Formula D, Example IV).

The compositions of this invention are also useful as biocides. In Formula E, Example V, one equivalent of 2-chloropropionic acid and one equivalent of oleic acid were combined with two equivalents of ether diamine. The composition functions as a mildewcide when added to a commercial paint formulation. In addition to paints, selected compositions may be used as antiseptic agents in toiletries and soaps and as disinfectants in cleansers. Some compositions can be used in food processing, such as Formulas F and G, Examples VI and VII, were used as antibacterial agents for poultry processing rinses. Some compositions may be used as surfactants in enhanced oil recovery. Some compositions are useful as liquid crystals.

In some instances, it was found to be advantageous to add minute amounts of materials of high charge density to pigment slurries before adding the compositions of this invention. Strong acids and bases function in this way (Example II). Such acids and bases as aluminum chloride (28% in water), formic acid, and 2-amino 2-methyl-1-propanol have been used.

EXAMPLE I
Titanium Dioxide Filter Cake (61% Solids)

Two and one half percent based on dry weight of pigment) of Formula A were added to titanium dioxide slurry (ASTM 476-73, 1988. Type II, III, IV). The slurry was mixed for optimal pigment particle coverage and dried. The dry pigment was suitable for use in waterborne and solvent borne paint formulations.

EXAMPLE II
Titanium Dioxide—Filter Cake (55% Solids)

One and one half percent (based on pigment solids) of Formula B was added to titanium dioxide slurry (Type II, III, and IV) previously treated with 0.1 percent (based on dry weight of pigment) of aluminum chloride (28% in water). The slurry was mixed well and dried. Dry pigment was suitable for dispersion in waterborne and solvent borne paints.

EXAMPLE III
Direct Add Dispersant—Titanium—Dioxide (Type II, III, IV)
400 ml plastic beaker—2" blade—2100 rpm
Grind portion:
  40 grams medium oil alkyd
  80 grams titanium dioxide
    (95% $TiO_2$ $Al_2O_3$ additive—Type II, III, IV)
  2.0 grams Formula C
Grind is 7–8 Hegman in two minutes.
Let down:
  88.6 grams grind portion
  144.0 grams medium oil alkyd
  21.0 grams mineral spirits
  driers and antiskinning agent
Smooth, high gloss films.

Therefore the compositions of this invention perform as dispersants when used in conventional paint formulations.

EXAMPLE IV
Direct Add Dispersant—Titanium Dioxide (Type II, III, IV)
400 ml plastic beaker—2" blade—2100 rpm
Grind portion:
  40 grams medium oil alkyd 80 grams titanium dioxide
(95% TiO$_2$ Al$_2$O$_3$ additive Type II, III, IV)
2.0 grams Formula D
Grind is 7–8 Hegman in two minutes
Let down:
  88.6 grams grind portion
  144.0 grams medium oil alkyd
  21.0 grams mineral spirits
  driers and antiskinning agent
Smooth, high gloss films.

EXAMPLE V

Exterior Exposure—Mildewcide
  Substrate: 3/8"×4"×20" Interior Masonite Panel.
  Paint: Sears Interior Semi Gloss Wall & Trim #78114.
  Panel A: Two brush coats paint with no addition.
  Panel B: Two brush coats of paint with five grams Formula E added to one half pint.
  Results: After seven weeks exterior, vertical South, the untreated panel is covered with incipient mildew. No mildew was found on painted area treated with Formula E.

EXAMPLE VI

Antibacterial Poultry Rinse

Formula F (twenty percent chlorine by weight), two equivalents of trichloroacetic acid and one equivalent of ether acid combined with three equivalents of ether diamine was used at the rates of 1%, 0.5%, and 0.25% in water as an antibacterial poultry rinse. Birds were immersed for 15 seconds, allowed to drip, and immersed in slush ice for two hours. They were removed, drained and rinsed with a 400 ml sterile Butterfield Phosphate solution for one minute. Rinsate was then plated on Aerobic Count and *E. coli* count Petri Film. Controls immersed in plain water and non-treated controls were included. Results were as follows:
Antimicrobial Study: Whole Broilers treated with 1.0, 0.50 and 0.25'% Solutions ( 20% Chlorine)
A=1% solution, B=0.5% solution, C=0.25% solution, D=Control, E=Non-treated control (CFU's/ml*)

| Sample | Treatment | APC | *Ecoli* |
|---|---|---|---|
| 1 | A | 520 | 0 |
| 2 | A | 50 | 0 |
| 3 | A | 205 | 0 |
| 4 | A | 280 | 0 |
| 5 | A | 797 | 0 |
|  | AVG. | 370 | 0 |
|  | % Reduction | 92 | 100 |
| 1 | B | 360 | 0 |
| 2 | B | 130 | 0 |
| 3 | B | 730 | 0 |
| 4 | B | 580 | 0 |
| 5 | B | 200 | 0 |
|  | AVG. | 400 | 0 |
|  | % Reduction | 91 | 100 |
| 1 | C | 540 | 6 |
| 2 | C | 610 | 2 |
| 3 | C | 970 | 0 |
| 4 | C | 580 | 2 |
| 5 | C | 390 | 0 |
|  | AVG. | 618 | 2 |
|  | % Reduction | 87 | 99 |
| 1 | D | 5,400 | 570 |
| 2 | D | 6,100 | 1,160 |
| 3 | D | 1,290 | 56 |
| 4 | D | 7,300 | 210 |
| 5 | D | 6,500 | 62 |
|  | AVG. | 5,318 | 412 |
|  | % Reduction | −15 | −57 |
| 1 | E | 1,390 | 45 |
| 2 | E | 5,800 | 190 |
| 3 | E | 2,900 | 150 |
| 4 | E | 7,400 | 360 |
| 5 | E | 5,700 | 570 |
|  | AVG. | 4,638 | 263 |

*based on a 400 ml one bird rinse

EXAMPLE VII

Antibacterial Poultry Rinse

Formula G (fifteen percent fluorine by weight), three equivalents of trifluoroacetic acid and one equivalent of ether acid combined with four equivalents of ether diamine was used at the rates of 1%, 0.25%, and 0.05% in water as in Example VI. Results were as follows: Antimicrobial Study: Whole Broilers treated with 15% Fluorine solution @ 1.0, 0.25 and 0.05%

A=1% solution, B=0.25% solution, C 0.05% solution, D=Control, E Non-treated control (CFU's/ml*)

| Sample # | Treatment | APC | *Ecoli* |
|---|---|---|---|
| 1 | A | 135 | 0 |
| 2 | A | 120 | 0 |
| 3 | A | 115 | 1 |
| 4 | A | 265 | 0 |
| 5 | A | 105 | 0 |
|  | AVG. | 148 | 0 |
|  | % Reduction | 99 | 100 |
| 1 | B | 920 | 0 |
| 2 | B | 250 | 0 |
| 3 | B | 1,030 | 0 |
| 4 | B | 1,210 | 0 |
| 5 | B | 380 | 0 |
|  | AVG. | 758 | 0 |
|  | % Reduction | 97 | 100 |
| 1 | C | 3,500 | 14 |
| 2 | C | 1,670 | 4 |
| 3 | C | 3,300 | 0 |
| 4 | C | 4,200 | 6 |
|  | AVG. | 3,168 | 6 |
|  | % Reduction | 88 | 99 |
| 1 | D | 1,510 | 49 |
| 2 | D | 3,400 | 42 |
| 3 | D | 13,000 | 50 |
| 4 | D | 19,500 | 105 |
| 5 | D | 14,100 | 16 |
|  | AVG. | 10,302 | 52 |
|  | % Reduction | 61 | 91 |
| 1 | E | 15,300 | 34 |
| 2 | E | 18,100 | 470 |
| 3 | E | 27,000 | 94 |
| 4 | E | 7,400 | 60 |
| 5 | E | 63,000 | 2,400 |
|  | AVG. | 26,160 | 612 |

*based on a 400 ml one bird rinse

EXAMPLE VIII

Aluminum Trihydroxide—Filter Cake (48% Solids)

Aluminum trihydroxide (median particle size 1.0 micron) was treated with 0.1 percent (based on dry pigment weight) hydrochloric acid (37.4%). One percent (based on dry pigment weight) of Formula H (one equivalent of 2-chloropropionic acid and one equivalent of $C_{18}$ polymerized fatty acid combined with two equivalents of tallow diamine) (the reaction being carried out in 25% by weight of propylene glycol based on the weight of the reactants) was added to the slurry and mixed for optimal particle coverage. The resulting aluminum trihydroxide treated pigment was suitable for employment in alkyd resin or EPDM rubber formulations.

EXAMPLE IX

Phthalocycanine Blue—Filter Cake (45% Solids)

Four percent (based on dry weight of pigment) of Formula H (see Example VIII) was slurried with phthalocyanine blue filter cake. The resulting pigment was suitable for incorporation into waterborne and solvent borne inks.

What is claimed is:

1. A pigment dispersant composition consisting of the reaction product of a halogenated carboxylic acid and an amine wherein the reaction takes place in a reaction medium.

2. The composition of claim 1 wherein the medium is propylene glycol.

3. The composition of claim 1 wherein the medium is isopropyl alcohol.

4. The composition of claim 1 wherein the halogenated carboxylic acid is trichloroacetic acid.

5. The composition of claim 1 wherein the halogenated carboxylic acid is trifluoroacetic acid.

6. A pigment dispersant composition consisting of the reaction product of a halogenated carboxylic acid and an amine wherein the halogenated carboxylic acid is 2-chloropropionic acid.

7. A pigment dispersant composition consisting of the reaction product of a halogenated carboxylic acid and an amine wherein the amine is tallow diamine.

8. A pigment dispersant composition consisting of the reaction product of a halogenated carboxylic acid and an amine wherein the amine is an ether diamine.

9. A biocidal composition consisting of the reaction product of a halogenated carboxylic acid and an amine wherein the reaction takes place in a reaction medium.

* * * * *